(12) United States Patent
Chene et al.

(10) Patent No.: US 7,516,522 B2
(45) Date of Patent: Apr. 14, 2009

(54) CLAMPING COLLAR

(75) Inventors: Richard Chene, Maray (FR); Didier Goussalt, Romorantin (FR)

(73) Assignee: Etablissements Caillau, Issy-les-Moulineaux (FR)

( * ) Notice: Subject to any disclaimer, the term of this patent is extended or adjusted under 35 U.S.C. 154(b) by 304 days.

(21) Appl. No.: 10/521,326

(22) PCT Filed: Jul. 10, 2003

(86) PCT No.: PCT/FR03/02162

§ 371 (c)(1),
(2), (4) Date: Jan. 14, 2005

(87) PCT Pub. No.: WO2004/008015

PCT Pub. Date: Jan. 22, 2004

(65) Prior Publication Data

US 2005/0246869 A1 Nov. 10, 2005

(30) Foreign Application Priority Data

Jul. 15, 2002 (FR) .................................... 02 08884

(51) Int. Cl.
*F16L 33/04* (2006.01)
(52) U.S. Cl. .................... 24/279; 29/525.01; 29/890.14

(58) Field of Classification Search ........ 24/274 R–274 WB, 279–286, 20 LS; 411/546, 547, 537, 411/538, 166; 285/410, 411, 420, 367; 29/508, 29/525.02, 890.14, 525.01
See application file for complete search history.

(56) References Cited

U.S. PATENT DOCUMENTS

| 2,270,375 A | | 1/1942 | King |
| 3,181,901 A | * | 5/1965 | Watts .......................... 285/367 |
| 4,834,431 A | * | 5/1989 | Calmettes et al. ........... 285/410 |
| 5,271,648 A | * | 12/1993 | Krausz ....................... 285/373 |

FOREIGN PATENT DOCUMENTS

| EP | 03 05232 | | 3/1989 |
| JP | 08061315 A | * | 3/1996 |
| WO | WO-98 43010 | | 10/1998 |

\* cited by examiner

*Primary Examiner*—James R Brittain
(74) *Attorney, Agent, or Firm*—Connolly Bove Lodge & Hutz LLP

(57) ABSTRACT

A clamping collar comprising an open ring (10), each end of which carries a bearing tab (10A, 10B), and tightening means comprising a tightening bolt (14) whose shank passes through the bores (12A, 12B) in the bearing tabs, a nut (16), and a spacer (18). In order to tighten the collar, the head of the bolt or the nut are driven in rotation. The spacer is disposed between the element that is driven in rotation and the corresponding bearing tab. The spacer (18) is formed by a rolled-up blank disposed around the shank (14B) of the bolt (14).

20 Claims, 3 Drawing Sheets

CLAMPING COLLAR

CROSS-REFERENCE TO RELATED APPLICATIONS

This application is a U.S. National Stage entry under 35 U.S.C. § 371 of co-pending International Patent Application No. PCT/FR03/02162, filed on Jul. 10, 2003 by CHENE, Richard et al. entitled CLAMPING COLLAR, the entire contents of which is incorporated by reference. Priority is claimed to French Patent Application No. 0208884, filed on Jul. 15, 2002, the entire contents of which is incorporated by reference, and for which priority is claimed under 35 U.S.C. § 119.

The present invention relates to a clamping collar comprising an open ring, each end of which carries a bearing tab provided with a bore, and tightening means comprising a tightening bolt, a nut, and a spacer, the bolt having a shank that passes through the bores in the bearing tabs and a head situated beside one of the bearing tabs, the nut being situated beside the other bearing tab, and co-operating with the shank of the bolt, at least a first one of the two elements constituted by the head of the bolt and by the nut being suitable for being driven in rotation so as to tighten the bolt, and the spacer being disposed between said first element and the bearing tab beside which said first element is situated.

A clamping collar of this type is known, for example, from Documents EP 0 305 232, and WO 98/43 010.

The spacer enables the element that is to be driven in rotation (nut or bolt head) to be spaced apart to some extent from the bearing tab on the collar, and also from the ring of said collar. Thus, said element is more easily accessible for the collar-tightening tool.

Naturally, another possibility for facilitating such access consists in making the element in question relatively long so that an end portion of said element is easily accessible for the tightening tool. In which case, that tab of the element which does not co-operate with the tightening tool could be implemented in the form of a portion having a circular cross-section.

However, such a solution suffers from the drawback of being relatively costly.

The presence of a spacer is thus advantageous, especially if said spacer is a relatively inexpensive part.

An object of the present invention is to improve further the known state of the art by proposing a collar whose spacer is a part that is very inexpensive and simple to manufacture.

This object is achieved by means of the fact that the spacer is formed by a rolled-up blank disposed around the shank of the bolt.

By providing a blank cut to the correct length and width dimensions, it is very simple to roll up said blank and to dispose it around the shank of the bolt to form a substantially cylindrical spacer. If, depending on the type of collar and on the type of tightening tool, spacers of different lengths are necessary, it is merely necessary to make such spacers from a plurality of blanks whose widths are chosen accordingly. The manufacturing tools do not need to be otherwise modified, and, overall, the spacer is a part that is very inexpensive.

Advantageously, the bearing tab against which the spacer is disposed is provided with a lip and the join plane between the two ends of the blank from which the spacer is formed is engaged under said lip.

During tightening, the spacer is subjected to relatively large stresses, which are exerted axially in particular. The lip retains the spacer and prevents any risk of it opening in its join plane.

Another object of the invention is to provide a clamping collar of the above-mentioned type, known from Documents EP 0 305 232 and WO 98/43 010, that improves distribution of the forces that are exerted on the collar while it is being tightened.

Prior to tightening of the collar, the shank of the bolt extends substantially parallel to a diameter of the circle of which the ring of the collar defines a portion. During tightening, the two bearing tabs move towards each other and their orientations relative to that direction change due to the reduction in the diameter of the ring. Thus, prior to tightening of the collar, the two bearing tabs can be substantially mutually parallel and thus perpendicular to the above-mentioned diameter, or else they can flare a little apart from each other in the direction going away from the center of the collar. Conversely, at the end of tightening, due to the reduction in the diameter of the ring, the bearing tabs are inclined towards each other in the direction going away from the center of the collar.

This inclination modifies the orientation of the bolt relative to the bearing tabs, so that the high tightening stresses, applied in particular at the end of tightening, might be poorly distributed, or might even give rise to weakening, warping, or even breakage of the bolt, of the spacer, or of the bearing tab in question.

An object of the invention is to improve that situation.

This object is achieved by the fact that the spacer presents a first end edge co-operating with said first element, and a second end edge co-operating with the bearing tab against which the spacer is disposed, the first end edge being substantially perpendicular to the longitudinal direction of the spacer while, at least when the collar is in the tightened state, the second end edge is inclined relative to the perpendicular to said longitudinal direction, the inclination of the second edge being such that the length of the spacer increases in the direction going away from the ring of the collar.

It is naturally at the end of tightening that the stresses exerted on the bearing tabs are at their highest. The tightening forces are applied directly to the element (head of the bolt, or nut) which is driven in rotation by the tightening, and it is the spacer that transmits the forces to the bearing tab with which it co-operates.

By means of the above-mentioned shape, towards the end of tightening of the collar, the second end edge of the spacer is in contact with the bearing tab over substantially the entire periphery thereof. As a result, the tightening forces are well distributed over the bearing tab, thereby making it possible to prevent stresses that are locally too large from giving rise to weakening, warping, or even breakage of the bolt, of the spacer, or of the bearing tab in question.

Advantageously, the blank that is rolled up to form the spacer presents a width that varies over the length of said blank.

The blank can easily be cut out from a sheet of metal to form a strip of substantially constant length but of width that varies so as to impart the inclination of the second end edge of the spacer relative to the first end edge thereof when the blank is rolled up to form the spacer.

In an advantageous variant, the spacer is deformable over a portion of its periphery in its length direction. By convention, the length of the spacer is measured when the spacer is put in place on the bolt in the axial direction of the bolt.

It can then be chosen for the second end edge of the spacer to be in contact over substantially its entire periphery with the bearing tab with which it co-operates throughout the tightening of the collar or over a large portion of the stroke of the bearing tabs during said tightening. As the tightening progresses, the spacer can then become deformed so that, when the collar is in the tightened state, the spacer reaches the above-mentioned inclination of its second edge. Said spacer can be made from a blank of constant width.

For example, before the collar is tightened, the spacer may present a transverse slot that extends over a portion of the periphery of the spacer situated on the side closer to the ring of the collar and that is suitable for closing up at least in part when the collar is tightened.

Initially, the slot presents a width (as measured in the length direction of the spacer) that is relatively large because said width decreases during tightening. This constitutes a simple and effective manner of providing the spacer with the capacity to deform longitudinally during tightening.

The invention will be well understood and its advantages will appear more clearly on reading the following detailed description of an embodiment shown by way of non-limiting example. The description refers to the accompanying drawings, in which.

Figure 1:
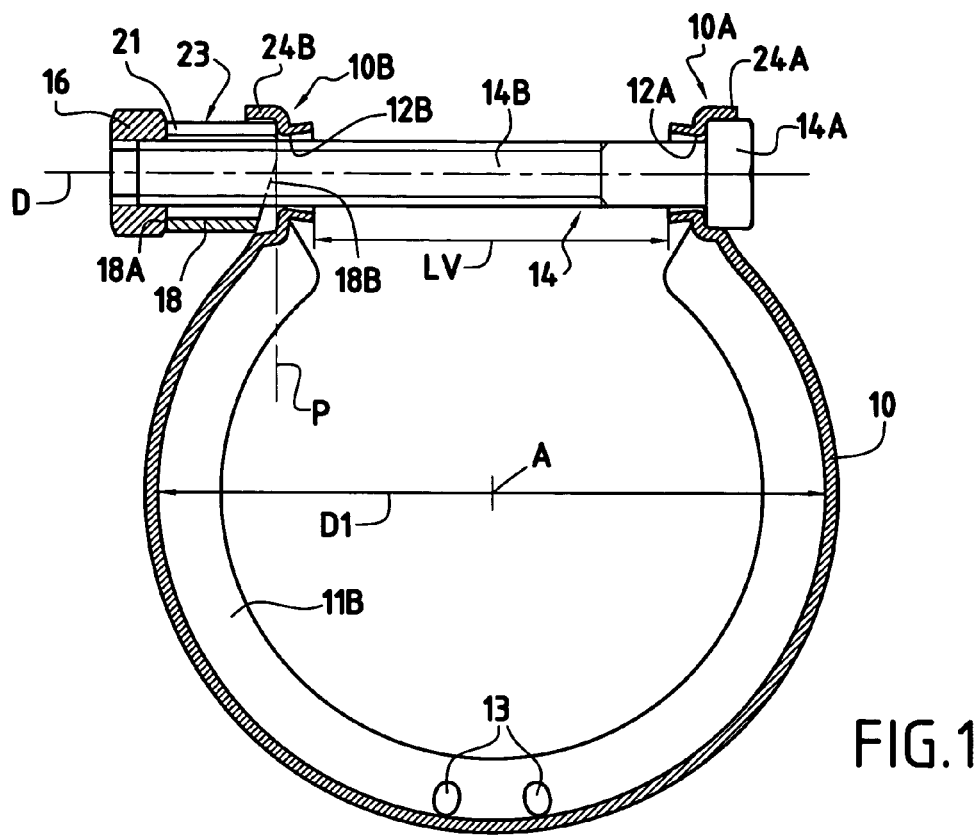
FIG. 1 shows a collar of the invention in the non-tightened position, in a section view taken perpendicularly to its axis.
Figure 2:
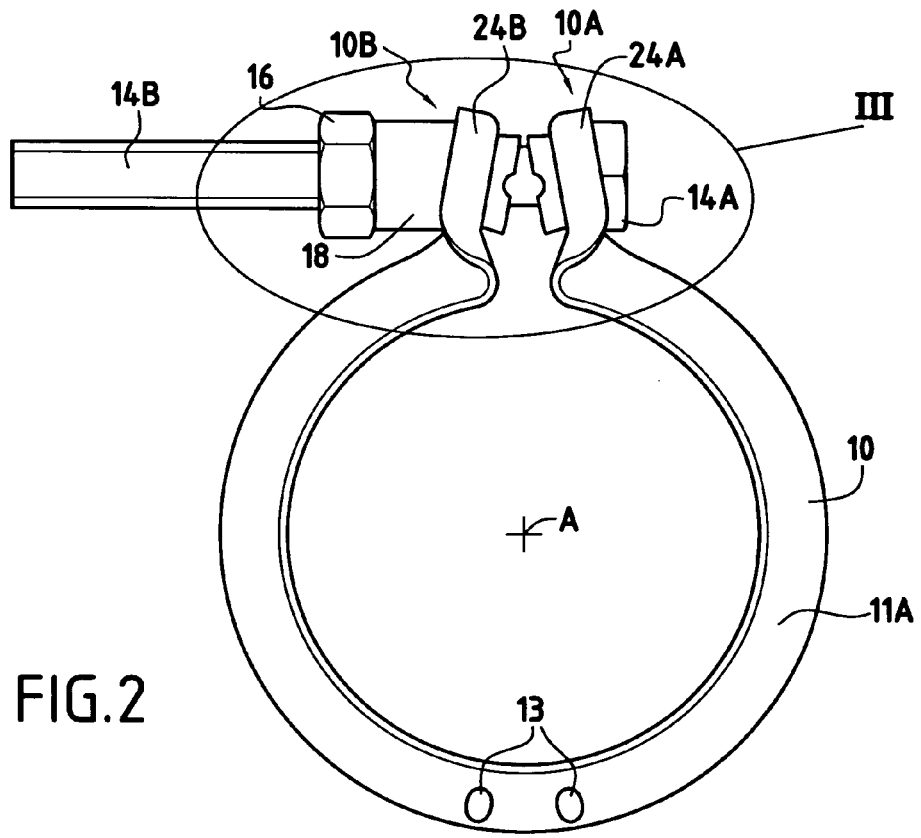
FIG. 2 is a view from the outside of the same collar in the tightened state.

As can be seen in FIGS. 1 and 2, the collar comprises a ring 10 which is open and whose ends carry respective bearing tabs 10A and 10B.

Each of the bearing tabs is provided with a bore, respectively 12A and 12B.

The tightening means for tightening the collar comprise a tightening bolt 14 whose head 14A rests against the bearing tab 12A, and whose shank 14B passes through the bores 12A and 12B. At its end opposite from the head, and on the other side of the bearing tab 10B from the side on which the bearing tab 10A is situated, the shank 14B co-operates with a nut 16. A spacer 18 is disposed between the nut 16 and the bearing tab 10B.

Figure 4:
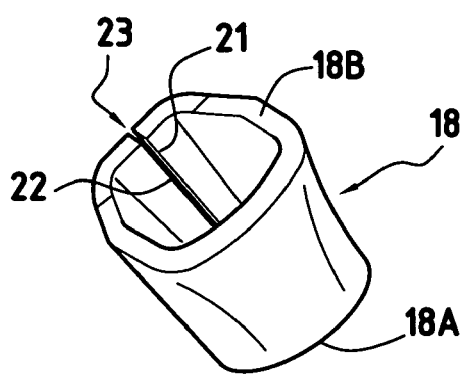
FIGS. 4 and 5 are perspective views of the spacer used on the collar.
Figure 5:
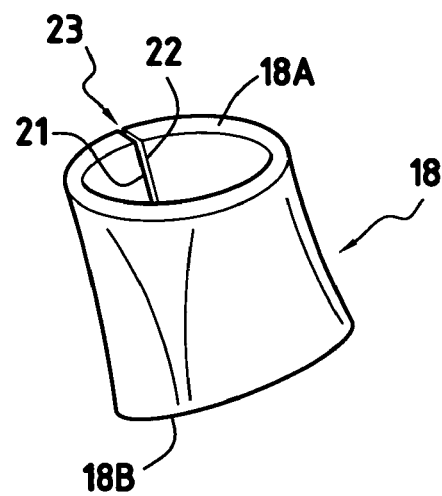
Figure 6:
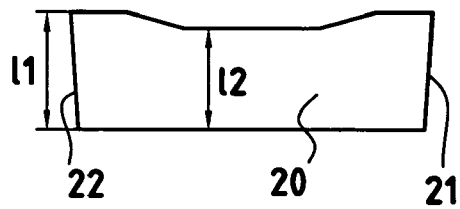
FIG. 6 shows the blank from which the spacer is made.

The spacer is formed from the blank 20 shown in FIG. 6, which blank is rolled up so that its ends 21 and 22 come to face each other, as can be seen in particular in FIGS. 4 and 5. As a result of being rolled up, the spacer is substantially cylindrical in shape, and its length makes it possible to keep the nut 16 at a certain distance away from the tab 10B in order to facilitate tightening said nut.

Figure 3:
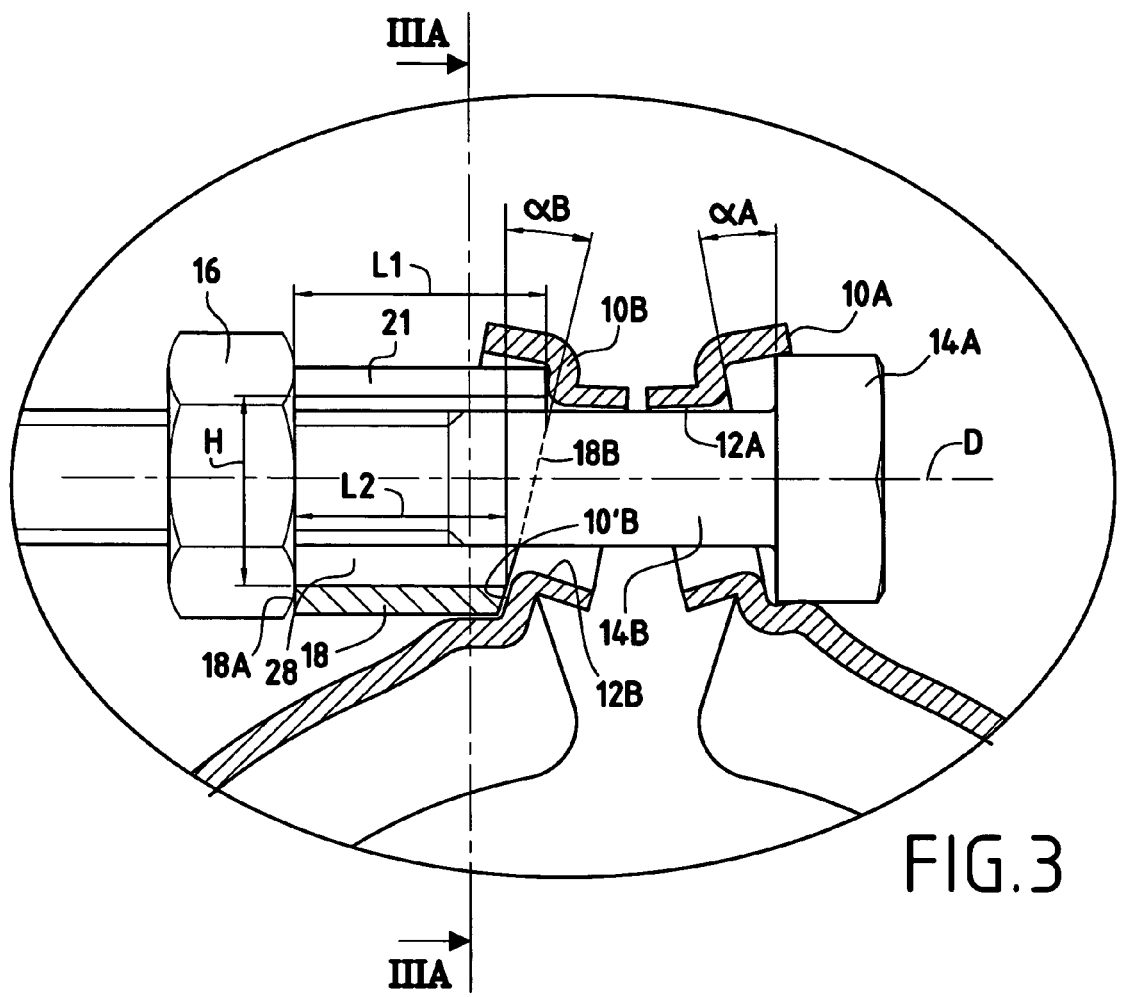
FIG. 3 is a section view of the region III of FIG. 2, on the same plane as the section view of the FIG. 1.

The ends 21 and 22 of the blank in which the spacer is formed are disposed one against the other, or at a very small distance from each other so as to form a join plane 23 for the spacer. The section views of FIGS. 1 and 3 are take on said join plane.

Each of the bearing tabs 10A and 10B presents a respective lip 24A or 24B, formed by folding.

In order to form the bearing tabs, the ends of the strip from which the ring of the collar is formed are folded out substantially radially and the edges of each tab are moved in the direction extending away from the other bearing tab.

Thus, the head 14A of the bolt can fit under the lip 24A. For example, the head is formed by six flats, and the lip can have an outline matching the six flats in part, thereby forming means for preventing the bolt from turning.

The spacer is engaged under the lip 24B of the bearing tab 10B.

FIG. 1 shows that, even when the collar is in the non-tightened state, the join plane 23 in which the two ends 21, 22 of the blank 20 come together lies under said lip. This makes it possible to prevent the join plane from "opening", i.e. to prevent the spacer from unrolling in part while the collar is being tightened. In particular in FIG. 3A, it can be seen that the inside periphery of the lip 24B has a shape matching the outside periphery of the spacer, at least in the region of the join plane 23, so as effectively to prevent said spacer from opening.

In the advantageous example shown, the ring 10 of the collar presents a cross-section that defines two branches, respectively 11A and 11B. For example, the cross-section is substantially V-shaped. The collar is adapted to clamping together two tubes. On its outside periphery, each of the tubes has a bearing surface which is formed on a flange and which co-operates respectively with the branch 11A or with the branch 11B. For example, the tubes are exhaust pipes. The tip of the V-shape formed by the cross-section of the ring can be very rounded, or even almost flat, as in WO 98/43 010.

In addition, in the example shown, the ring of the collar is formed integrally in one-piece, but it should be understood that it could also be made up of two pieces hinged relative to each other as in WO 98/43 010.

It can be observed that each of the branches 11A and 11B has two projections 13 on the outside periphery of the collar. The projections, which are disposed in a region diametrically opposite from the bearing tabs 10A and 10B, serve as angular position indicators for mounting the collar on the tubes.

The spacer 18 has a first end edge 18A that co-operates with the nut 16, and a second end edge 18B that co-operates with the bearing tab 10B.

The first edge 18A is substantially perpendicular to the longitudinal direction of the spacer, corresponding to the axial direction D of the shank of the bolt. While the nut is turning for tightening the bolt, said nut is in contact with the end edge 18A over its entire periphery so that the stresses exerted by the nut on the spacer are distributed uniformly thereover.

Conversely, as can be seen in particular in FIGS. 1 and 3, the second end edge 18B of the spacer is inclined relative to the perpendicular P to said longitudinal direction D. The inclination is such that the length of the spacer increases in the direction going away from the ring of the collar. More precisely, the length L1 of the spacer is at its maximum over that longitudinal portion of said spacer which is furthest away from the axis A of the collar, whereas its length L2 is at its minimum over its longitudinal portion that is closest to said axis A.

It can be seen in FIG. 1 that, when the collar is in the non-tightened state, the two bearing tabs 10A and 10B extend substantially perpendicularly to the axial direction D of the bolt (they are both parallel to the direction P).

While the collar is being tightened, the bearing tabs 10A and 10B move towards each other, and the diameter of the collar decreases considerably. For example, the tightening stroke corresponds substantially to the length LV of the shank portion of the bolt that extends between the two bearing tabs when the collar is in the non-tightened state, and it can be approximately in the range 40 millimeters (mm) to 60 mm. As a result, in particular, of the presence of the lips 24A and 24B, the bearing tabs 10A and 10B are stiffened so as to prevent them from buckling during tightening. Nevertheless, the considerable reduction in the diameter of the collar while it is being tightened causes the inclination of the bearing tabs relative to the axial direction D of the bolt to change. It can be seen in FIG. 3 that, when the collar is in the tightened state, the bearing tabs 10A and 10B are inclined relative to the perpendicular P to said direction D at respective angles αA and αB. Advantageously, the two angles are equal and opposite. The inclination of the end edge 18B of the spacer relative to its longitudinal direction is substantially equal to the angle αB. Thus, at the end of tightening, when the stresses exerted by the nut 16 on the spacer are at their highest, the spacer is properly in abutment against the outside face 10'B of the bearing tab 10B, said outside face being the face that is further away from the bearing tab 10A. As a result, the stresses are distributed uniformly over the bearing tab 10B, and the shank of the bolt remains naturally parallel to the diameter D1 of the ring of the collar.

Tightening of higher quality is thus obtained, in particular by avoiding subjecting the shank of the bolt to bending stresses while it is being tightened. Since the tightening stresses are high, the spacer end edge naturally tends to bear against the outside face of the bearing tab with which said spacer co-operates. If said edge is substantially perpendicular to the longitudinal direction of the spacer while said outside face of the bearing tab is not, this tends to subject the shank of the bolt to bending stress perpendicular to its axial direction. Each time the nut turns on the shank, this bending stress changes direction relative to the shank of the bolt. During the tightening, the shank of the bolt is thus subjected not only to an axial stress but also to an infinite number of radial bending stresses that can damage the thread of the bolt.

Advantageously, as in the example shown, the join plane of the spacer faces outwards from the collar. It is thus in the region of said join plane that the length L1 of the spacer is at its maximum.

As can be seen in FIG. 6, the blank 20 from which the spacer is formed presents a width that varies over its length. In this example, it presents a width l1 in the regions of its ends 21 and 22 and a smaller width l2 in a central segment.

Advantageously, the collar is provided with wedging means for preventing the spacer from turning relative to the ring.

In this example, the lip 24B under which the spacer 18 is engaged via its end edge 18B presents at least one wedging facet (three facets 25A, 25B, and 25C in the example shown) which co-operates with a portion of the periphery of the spacer that has a non-circular cross-section (in the example shown, the spacer presents three flat portions 19A, 19B, and 19C).

Figure 3A:
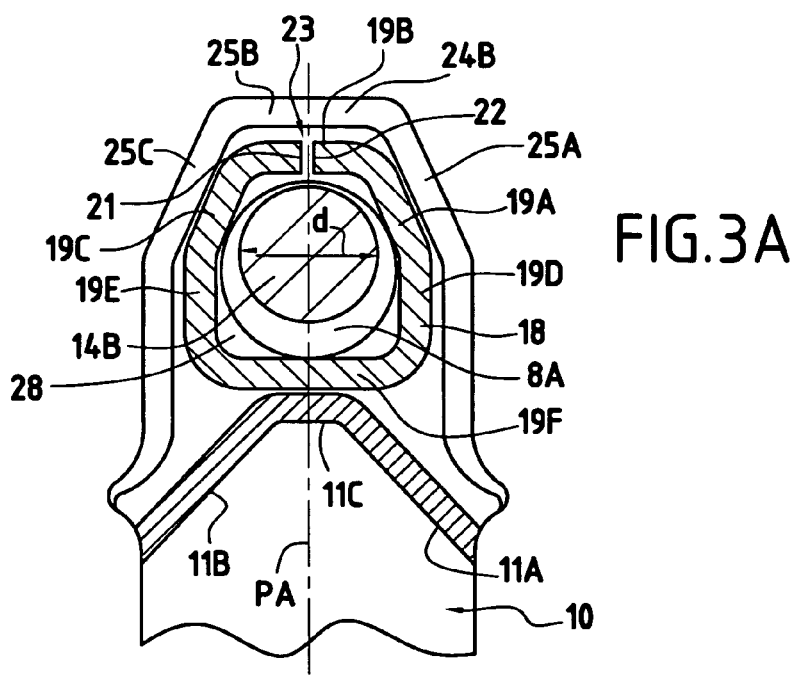
FIG. 3A is a section view on line IIIA-IIIA in FIG. 3.

The above-mentioned portions 19A to 19C are situated in the "top" region of the spacer, i.e. in that region thereof which is furthest away from the axis A of the collar. Going towards the axis A, the end edge 18B of the spacer presents branches, respectively 19D and 19E, substantially parallel to the plan PA which is a plane perpendicular to the axis of the collar (see FIG. 3A). At their bottom ends, these branches are interconnected via a flat portion 19F that is substantially perpendicular to the direction DA. As can be seen in FIG. 3A, this flat region 19F faces the tip 11C of the slightly flattened segment of the collar under the spacer.

In the vicinity of its end edge 18A, the spacer 18 presents a cross-section that is substantially circular. Conversely, its cross-section is slightly elongate in a direction parallel to the plane PA. This cross-section is locally flattened on the side closer to the ring, in the vicinity of the end edge 18B. In order to achieve this difference in cross-section over the length of the spacer, the ends 21 and 22 of the blank 20 may be slightly divergent so that the length of said blank varies slightly over its width.

More precisely, with reference to FIGS. 4 and 5, it can be seen that the cross-section of the spacer varies progressively between a circular cross-section at its end edge 18A and its cross-section comprising the portions 19A to 19F at its end edge 18B.

The inside periphery of the spacer defines a channel 28 whose height H, as measured in the plane in which the bearing tabs come towards each other during tightening of the collar, which plane is also the above-mentioned plane PA, is greater than the diameter d of the shank of the bolt. Even though the height of said channel varies due to the above-mentioned variation in the cross-section of the spacer, said height remains greater than the diameter of the shank of the bolt. For example, the height of the channel is at least 1.2 times the diameter d.

Figure 7:
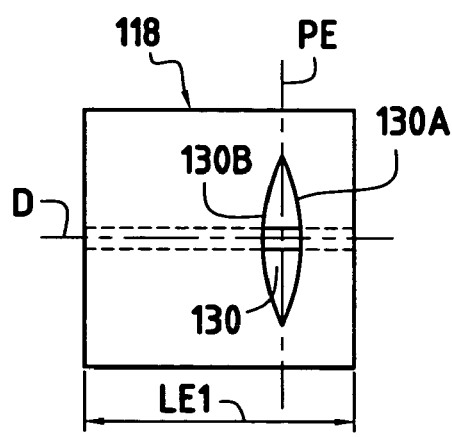
FIG. 7 is an elevation view showing a spacer in a variant embodiment, before the collar is tightened.
Figure 8:
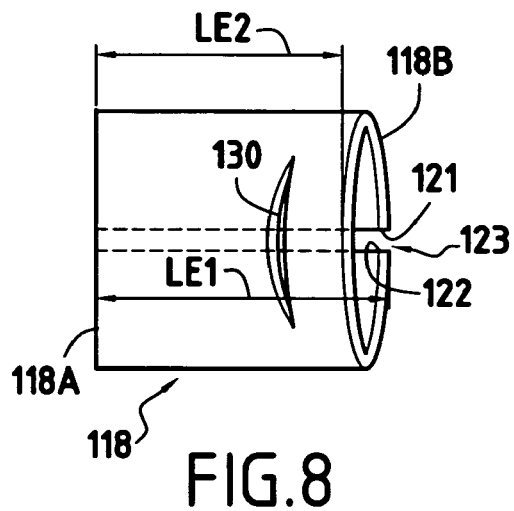
FIG. 8 shows the spacer of FIG. 7 after the collar has been tightened.

In the variant shown in FIGS. 7 and 8, the spacer 118 is deformable over a portion of its periphery, in the length direction. Thus, when the collar is in the non-tightened state, the spacer presents a first length LE1 which is, for example, the same over its entire periphery.

While the collar is being tightened, a portion of said periphery is deformed so that the length of the spacer is modified, over the corresponding portion of the periphery, in order to accompany the above-mentioned inclination of the bearing tabs of the collar, so as to be constantly in contact with the outside face 10'B of the bearing tab 10B.

For example, as can be seen in FIGS. 7 and 8, before the collar is tightened, the spacer 118 presents a transverse slot 130 which extends over a portion of the periphery of the spacer. This portion is the portion that is situated closer to the ring of the collar 10 when the spacer is in position on the bolt. For example, the slot has two opposite concave edges, respectively 130A and 130B situated on either side of plane PE perpendicular to the longitudinal direction D of the spacer.

While the collar is being tightened, and due to the constraints exerted by the nut 16 and due to the reaction of the bearing tab 10B, the slot 130 closes up at least in part, so that, over the portion of the periphery of the spacer that is provided with the slot, the length LE2 of said spacer becomes less than its initial length LE1, that it keeps over a portion of its periphery that is opposite form said slot.

Advantageously, the slot 130 is situated over a portion of the periphery of the spacer that is opposite from the join plane 123 between its ends 121 and 122, it being possible for said join plane to be angularly positioned like the join plane 23 of the spacer of the preceding figures, and for it to be engaged under the lip 24D.

Naturally, the spacer 118 can have a cross-section that varies over its length, like the cross-section of the spacer 18, and it can be shaped so as to be prevented from rotating by being wedged under the lip of the bearing tab 10B.

It is very advantageous from a practical point of view, and in order to limit the manufacturing costs, to make the spacer having an inclined edge from a blank that is rolled up. However, it could also be made differently, e.g. it could be sliced from a tube.

In the above-described embodiment, it is the nut 16 that is driven in rotation to tighten the collar, and the spacer is disposed between said nut and the bearing tab 10B. The bolt head 14A is prevented from rotating by being wedged as indicated above.

It is possible to invert this embodiment, by preventing the nut 16 from rotating in the tab 10B by disposing the spacer 18 or 118 on the bolt head side, and by driving the head in rotation when tightening the collar.

Such an inverted configuration would offer the advantage of preventing the shank of the bolt from being offset too far out beyond the nut 16 when the collar is in the tightened state.

The invention claimed is:

1. A clamping collar comprising an open ring, each end of which carries a bearing tab comprising a bore, and tightening means comprising a tightening bolt, a nut, and a spacer, the bolt having a shank that passes through the bores in the bearing tabs and a head situated beside one of the bearing tabs, the nut being situated beside the other bearing tab, and co-operating with the shank of the bolt, at least a first one of the two elements constituted by the head of the bolt and by the nut being suitable for being driven in rotation so as to tighten the bolt, and the spacer being disposed between said first element and the bearing tab beside which said first element is situated and being formed by a rolled-up blank disposed around the shank of the bolt, wherein the bearing tab against which the spacer is disposed further comprises a lip and wherein a join plane disposed between the two ends of the blank from which the spacer is formed is engaged under said lip.

2. A collar according to claim 1, wherein said collar is provided with wedging means for wedging the spacer so that the latter is prevented from rotating relative to the ring.

3. A collar according to claim 1, wherein the bearing tab against which the spacer is disposed has a lip under which the spacer is engaged, and said lip presents at least one rotation-preventing wedging facet which co-operates with a portion of the periphery of the spacer that is not circular.

4. A collar according to claim 1, wherein the ring presents a substantially V-shaped cross-section whose tip projects from an outside periphery of the ring.

5. A clamping collar comprising an open ring, each end of which carries a bearing tab comprising a bore, and tightening means comprising a tightening bolt, a nut, and a spacer, the bolt having a shank that passes through the bores in the bearing tabs and a head situated beside one of the bearing tabs, the nut being situated beside the other bearing tab, and co-operating with the shank of the bolt, at least a first one of the two elements constituted by the head of the bolt and by the nut being suitable for being driven in rotation so as to tighten the bolt, and the spacer being disposed between said first element and the bearing tab beside which said first element is situated and being formed by a rolled-up blank disposed around the shank of the bolt, wherein a cross-section of said spacer is flattened on a side closer to the ring, in the vicinity of the second end edge of said spacer which co-operates with the bearing tab against which said spacer is disposed.

6. A collar according to claim 5, wherein the bearing tab against which the spacer is disposed has a lip under which the spacer is engaged, and said lip presents at least one rotation-preventing wedging facet which co-operates with a portion of the periphery of the spacer that is not circular.

7. A clamping collar comprising an open ring, each end of which carries a bearing tab comprising a bore, and tightening means comprising a tightening bolt, a nut, and a spacer, the bolt having a shank that passes through the bores in the bearing tabs and a head situated beside one of the bearing tabs, the nut being situated beside the other bearing tab, and co-operating with the shank of the bolt, at least a first one of the two elements constituted by the head of the bolt and by the nut being suitable for being driven in rotation so as to tighten the bolt, and the spacer being disposed between said first element and the bearing tab beside which said first element is situated and being formed by a rolled-up blank disposed around the shank of the bolt, wherein an inside periphery of the spacer defines a channel whose height as measured in a plane in which the bearing tabs come towards each other while the collar is being tightened, is greater than a diameter of the shank of the bolt, and further wherein a cross-section of said spacer is flattened on a side closer to the ring, in the vicinity of the second end edge of said spacer which co-operates with the bearing tab against which said spacer is disposed.

8. A clamping collar comprising an open ring, each end of which carries a bearing tab comprising a bore, and tightening means comprising a tightening bolt, a nut, and a spacer, the bolt having a shank that passes through the bores in the bearing tabs and a head situated beside one of the bearing tabs, the nut being situated beside the other bearing tab, and co-operating with the shank of the bolt, at least a first one of the two elements constituted by the head of the bolt and by the nut being suitable for being driven in rotation so as to tighten the bolt, and the spacer being disposed between said first element and the bearing tab beside which said first element is situated and being formed by a rolled-up blank disposed around the shank of the bolt, wherein an inside periphery of the spacer defines a channel whose height as measured in a plane in which the bearing tabs come towards each other while the collar is being tightened, is greater than a diameter of the shank of the bolt, and further wherein the height of the channel is at least equal to 1.2 times the diameter of the shank of the bolt, and further wherein a cross-section of said spacer is flattened on a side closer to the ring, in the vicinity of the second end edge of said spacer which co-operates with the bearing tab against which said spacer is disposed.

9. A method for tightening a clamping collar comprising an open ring, each end of which carries a bearing tab provided with a bore, and tightening means comprising a tightening bolt, a nut, and a spacer, the bolt having a shank that passes through the bores in the bearing tabs and a head situated beside one of the bearing tabs, the nut being situated beside the other bearing tab, and co-operating with the shank of the bolt, at least a first one of the two elements constituted by the head of the bolt and by the nut being suitable for being driven in rotation so as to tighten the bolt, and the spacer being disposed between said first element and the bearing tab beside which said first element is situated, the spacer presenting a first end edge co-operating with said first element and a second end edge co-operating with the bearing tab against which the spacer is disposed, the spacer having a first end edge which is substantially perpendicular to a longitudinal direction of the spacer and a second end edge which is inclined relative to a perpendicular to said longitudinal direction, thereby defining a portion of maximum length and a portion of minimum length, the length of said spacer increasing from said minimum length to said maximum length in a direction going away from the ring of the collar, the method comprising:

positioning the collar in the non-tightened state around an object, such that the first end edge of the spacer is in contact with said first element over substantially the entire periphery of said first end edge, whereas the second end edge of the spacer is in contact with said second element via said portion maximum length, and the portion of minimum length is apart from said second element; and tightening the collar such that the bearing tabs move towards each other until said second end edge of the spacer is in contact with second element over substantially the entire periphery of said second edge.

10. A method for tightening a clamping collar according to claim 9, wherein the bearing tab against which the spacer is disposed presents a lip, and wherein the spacer is formed by a rolled-up blank disposed around the shank of the bolt, and a join plane between two ends of the blank from which the spacer is formed is engaged under said lip.

11. A method for tightening a clamping collar according to claim 9, wherein the spacer is formed by a rolled-up blank disposed around the shank of the bolt, said blank being rolled up to form the spacer and presenting a width that varies over a length of said blank.

12. A method for tightening a clamping collar according to claim 11, wherein the blank that is rolled up to form the spacer presents a maximum width in the vicinity of a join plane between two ends of said blank.

13. A method for tightening a clamping collar according to claim 9, wherein a cross-section of said spacer is flattened on a side closer to the ring, in the vicinity of the second end edge of said spacer which co-operates with the bearing tab against which said spacer is disposed.

14. A method for tightening a clamping collar according to claim 9, wherein said collar is provided with wedging means for wedging the spacer so that the latter is prevented from rotating relative to the ring.

15. A method for tightening a clamping collar according to claim 9, wherein the bearing tab against which the spacer is disposed has a lip under which the spacer is engaged, and said lip presents at least one rotation-preventing wedging facet which cooperates with a portion of the periphery of the spacer that is not circular.

16. A method for tightening a clamping collar according to claim 9, wherein the ring presents a substantially V-shaped cross-section whose tip projects from an outside periphery of the ring.

17. A method for tightening a clamping collar according to claim 9, wherein an inside periphery of the spacer defines a channel whose height as measured in a plane in which the bearing tabs come towards each other while the collar is being tightened, is greater than a diameter of the shank of the bolt.

18. A method for tightening a clamping collar according to claim 9, wherein the height of the channel is at least equal to 1.2 times the diameter of the shank of the bolt.

19. A clamping collar comprising an open ring, each end of which carries a bearing tab provided with a bore, and tightening means comprising a tightening bolt, a nut, and a spacer, the bolt having a shank that passes through the bores in the bearing tabs and a head situated beside one of the bearing tabs, the nut being situated beside the other bearing tab, and co-operating with the shank of the bolt, at least a first one of the two elements constituted by the head of the bolt and by the nut being suitable for being driven in rotation so as to tighten the bolt, and the spacer being disposed between said first element and the bearing tab beside which said first element is situated, the spacer presenting a first end edge co-operating with said first element and a second end edge co-operating with the bearing tab against which the spacer is disposed, the first end edge being substantially perpendicular to a longitudinal direction of the spacer while, when the collar is in a tightened state, the second end edge is inclined relative to a perpendicular to said longitudinal direction, an inclination of the second end edge being such that a length of the spacer increases in a direction going away from the ring of the collar, wherein the spacer is deformable over a portion of a periphery thereof, in a length direction thereof, and further wherein, before the collar is tightened, the spacer presents a transverse slot that extends over a portion of the periphery of the spacer situated on a side closer to the ring of the collar and that is suitable for closing up at least in part when the collar is tightened.

20. A collar according to claim 19, wherein the spacer is formed by a rolled-up blank disposed around the shank of the bolt.

* * * * *